United States Patent [19]

Loffelman et al.

[11] Patent Number: 4,461,861

[45] Date of Patent: Jul. 24, 1984

[54] POLYMER COMPOSITIONS STABILIZED WITH TRIAZINYL-PIPERIDINE COMPOUNDS

[75] Inventors: Frank F. Loffelman, Bridgewater; Thomas E. Brady, Whitehouse Station, both of N.J.

[73] Assignee: American Cyanamid Company, Stamford, Conn.

[21] Appl. No.: 501,218

[22] Filed: Jun. 6, 1983

Related U.S. Application Data

[62] Division of Ser. No. 285,240, Jul. 20, 1981, Pat. No. 4,400,505.

[51] Int. Cl.$^3$ .............................................. C08K 5/16
[52] U.S. Cl. ...................................... 524/100; 524/97
[58] Field of Search ................................... 524/97, 100

[56] References Cited

U.S. PATENT DOCUMENTS

| | | | |
|---|---|---|---|
| 4,108,829 | 8/1978 | Cassandrini et al. | 524/100 |
| 4,234,728 | 11/1980 | Rody et al. | 524/100 |
| 4,331,586 | 5/1982 | Hardy | 524/97 |
| 4,348,493 | 9/1982 | Loffelman | 524/100 |

Primary Examiner—Lester L. Lee
Attorney, Agent, or Firm—Steven J. Hultquist

[57] ABSTRACT

Compounds of the formula:

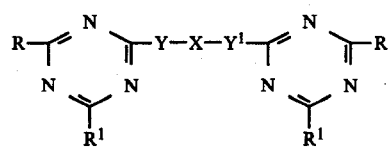

wherein at least one of the groups contains a 4-piperidinyl moiety are disclosed as light stabilizers for polymers.

7 Claims, No Drawings

POLYMER COMPOSITIONS STABILIZED WITH TRIAZINYL-PIPERIDINE COMPOUNDS

This is a division of application Ser. No. 285,240 filed July 20, 1981, now U.S. Pat. No. 4,400,505.

This invention relates to certain novel compounds and to their use as light stabilizers for polymers. More particularly, this invention relates to novel compounds of the formula (I)

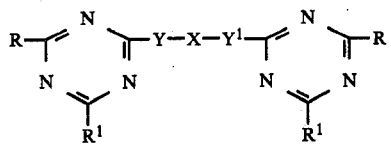

wherein R represents $C_3$–$C_6$ alkenyloxy, $C_3$–$C_6$ alkenylamino, or di($C_3$–$C_6$ alkenyl)amino; $R^1$ represents $C_1$–$C_8$ alkyl, $C_1$–$C_8$ alkoxy, halo, $C_1$–$C_8$ alkylthio, $C_3$–$C_6$ alkenyloxy, amino, $C_3$–$C_6$ alkenylamino, di($C_3$–$C_6$ alkenyl)amino, the groups

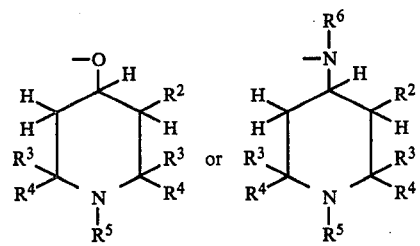

wherein $R^2$, $R^3$, $R^4$, $R^5$, and $R^6$ are as defined below, $C_1$–$C_{18}$ alkylamino, $C_1$–$C_{18}$ dialkylamino, morpholino, piperidino, pyrrolidyl, a substituted $C_1$–$C_{18}$ alkylamino, or a substituted $C_1$–$C_{18}$ dialkylamino, wherein the substituents are selected from amino, cyano, carboxy, alkoxycarbonyl wherein the alkoxy moiety has 1 to 8 carbon atoms, and the groups

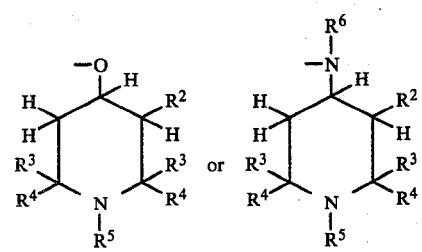

wherein $R^2$ represents hydrogen, $C_1$–$C_8$ alkyl, or benzyl; $R^3$ and $R^4$ independently represent $C_1$–$C_8$ alkyl, benzyl, or phenethyl, or together with the carbon to which they are attached form a $C_5$–$C_{10}$ cycloalkyl; and $R^5$ represents hydrogen, $C_2$–$C_3$ hydroxyalkyl, $C_1$–$C_8$ alkyl, hydroxyl, or oxyl; $R^6$ represents hydrogen, $C_1$–$C_8$ alkyl, or

wherein $R^2$, $R^3$, $R^4$, and $R^5$ are as previously defined; Y and Y', which may be the same, or different, represent oxy, or

wherein $R^6$ is as previously defined; X represents $C_2$–$C_{12}$ alkylene, wherein the alkylene chain may be interrupted by an oxy, thio, or $$-\overset{R^6}{\underset{|}{N}}-$$

radical, $C_5$–$C_{10}$ cycloalkylene,

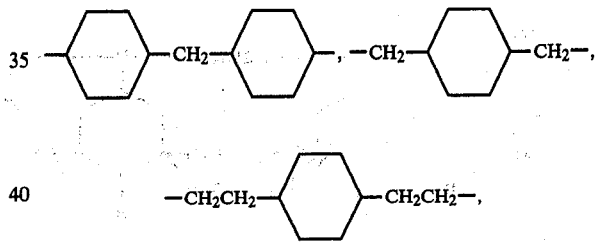

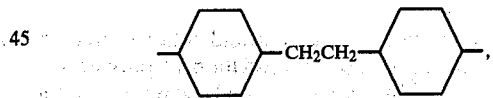

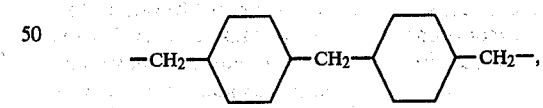

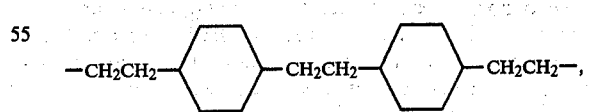

$C_6$–$C_{12}$ arylene, or $C_8$–$C_{14}$ aralkylene, with the proviso that when Y and Y' are oxy, or $R^6$ is hydrogen, or $C_1$–$C_8$ alkyl, at least one $R^1$ is, or contains,

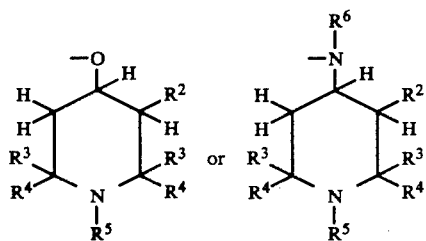

and with the further proviso that R and R¹ are not allyloxy at the same time.

The invention also relates to the use of such compounds for stabilizing polymers, particularly polyolefins, against degradation by ultraviolet radiation, and to the stabilized compositions.

The preferred compounds of formula (I) are represented by formula (II)

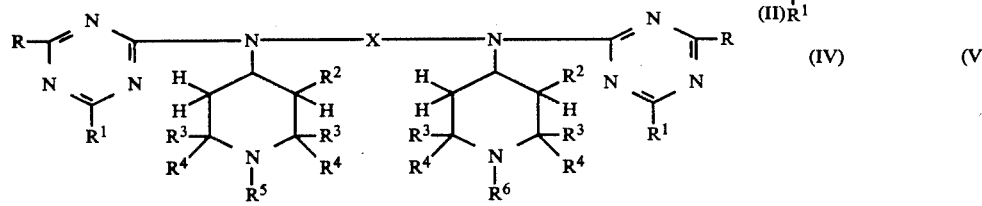

The especially preferred compounds are represented by formula (III).

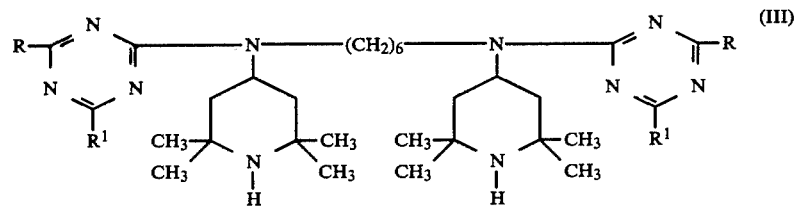

It is well-known that sunlight and other sources of ultraviolet radiation cause degradation of polymers as evidenced by embrittlement or yellowing of plastic articles made therefrom. It is also well-known that this degradation can be inhibited by use of ultraviolet light stabilizers incorporated in or on such articles. Various additives, used alone or in combinations, have been suggested to inhibit such light degradation in order to prolong the useful lives of articles made from polymers. Since none has been found to be completely satisfactory, research continues in order to find compounds, or combinations of compounds, which will be more satisfactory. The present invention arose out of such research and resulted in the discovery of novel compounds which stabilize polymers against degradation by ultraviolet light.

The stabilizers of the present invention offer the following advantages:

(1) excellent light-stabilizing activity,
(2) excellent compatibility with resins,
(3) low volatility,
(4) low extractability from polymers by laundering or dry cleaning, and
(5) excellent oven-aging stability.

W. German Offen. No. 2,308,611 discloses bridged 1,3,5-triazines containing allyloxy, methallyloxy, or propallyloxy substituents.

Beyer and Lemke Chem. Ber. 99(7), 2123–6 (1966) disclose bridged 1,3,5-triaiznes containing methallyl substituents.

U.S. Pat. No. 4,086,204 discloses polytriazine compositions containing a tetraalkyl piperidine, as light stabilizers for polymers.

The compounds of formula (I) may be prepared by reacting two moles of an appropriately substituted chloro-1,3,5-triazine of formula (IV) with one mole of an appropriately substituted diol, or diamine, of formula (V), as illustrated by the following reaction, wherein R, R', X, Y, and Y' are as previously defined.

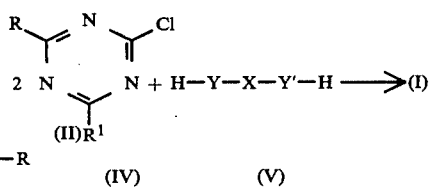

The preparation of suitable compounds of formulas (IV) and (V) is well-known in the art. The preparation of 4,4'-(hexamethylenediimino)bis(2,2,6,6-tetramethylpiperidine), also known as N,N'-bis(2,2,6,6-tetramethyl-4-piperidyl)hexamethylenediamine, is disclosed in U.S. Pat. No. 4,104,248, incorporated herein by reference.

Some compounds of formula (I) may be prepared by reacting a compound of formula (VI) with an appropriate amine or alcohol, as shown below.

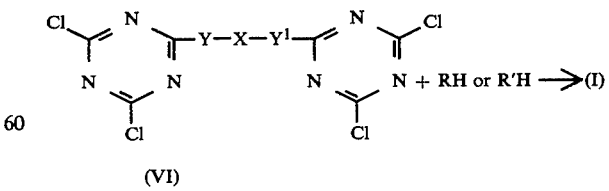

The compounds of formula (VI) may be prepared from cyanuric chloride and an appropriate diol, or diamine, by conventional methods.

Illustrative examples of suitable compounds of formula (I) include the following:

2,2'-[ethylenebis[(2,2,6,6-tetramethyl-4-piperidinyl)imino]]bis[4-allylamino-6-(2-cyanoethyl)amino-1,3,5-triazine], 2,2'-[hexamethylenebis[(2,2,6,6-tetramethyl-4-piperidinyl)imino]]bis(4-diallylamino-6-n-hexyl-1,3,5-triazine), 2,2'-[thiodiethylenebis[(2,2,6,6-tetraethyl-4-piperidinyl)imino]]bis[4-allylamino-6-(2-aminoethyl)amino-1,3,5-triazine], 2,2'-[oxydihexamethylenebis[(2,2,6,6-tetramethyl-4-piperidinyl)imino]]bis(4,6-diallyloxy-1,3,5-triazine), 2,2'-[hexamethylenebis[(2,2,6,6-tetramethyl-4-piperidinyl)imino]]bis[4-allyloxy-6-(2-carboxyethyl)amino-1,3,5-triazine], 2,2'-[hexamethylenebis[(2,2,6,6-tetramethyl-4-piperidinyl)imino]]bis(4-diallylamino-6-t-octylamino-1,3,5-triazine), 2,2'-[tetramethylenebis[1-(2-hydroxyethyl)-2,2,6,6-tetramethyl-4-piperidinyl]imino]bis(4,6-di-methallyloxy-1,3,5-triazine), 2,2'-[hexamethylenebis[(1-oxy-2,2,6,6-tetramethyl-4-piperidinyl)imino]]bis(4,6-(3-butenyl)amino-1,3,5-triazine), 2,2'-[hexamethylenebis[(1-hydroxy-2,2,6,6-tetramethyl-4-piperidinyl)imino]]bis(4,6-diallylamino-1,3,5-triazine), 2,2'-[hexamethylenebis[(2,2,6,6-tetramethyl-4-piperidinyl)imino]]bis-(4-diallylamino-6-methoxy-1,3,5-triazine), 2,2'-[hexamethylenebis[(2,2,6,6-tetramethyl-4-piperidinyl)imino]]bis(4-allyloxy-6-diethylamino-1,3,5-triazine), 2,2'-[trimethylenebis[(2,2,6,6-tetramethyl-4-piperidinyl)imino]]bis(4-allyloxy-6-n-butoxy-1,3,5-triazine), 2,2'-[hexamethylenebis[(2,2,6,6-tetramethyl-4-piperidinyl)imino]]bis(4,6-dimethallyloxy-1,3,5-triazine), 2,2'-[hexamethylenebis[(2,2,6,6-tetramethyl-4-piperidinyl)imino]]bis(4-chloro-6-dimethallylamino-1,3,5-triazine), 2,2'-[hexamethylenebis[(2,2,6,6-tetramethyl-4-piperidinyl)imino]]bis(4,6-di(5-hexenyl)amino-1,3,5-triazine), 2,2'-(hexamethylenediimino)bis[4-allyloxy-6-(2,2,6,6-tetramethyl-4-piperidinyl)amino-1,3,5-triazine], 2,2'-(hexamethylenediimino)bis[4-methallyloxy-6-(2,2,6,6-tetraethyl-4-piperidinyl)amino-1,3,5-triazine], 2,2'-(hexamethylenediimino)bis[4-methallyloxy-6-(2,2,6,6-tetramethyl-4-piperidinyl)oxy-1,3,5-triazine], 2,2'-[ethylenebis[(2,2,6,6-tetramethyl-4-piperidinyl)imino]]bis[4,6-di(3-butenyl)amino-1,3,5-triazine], 2,2'-[hexamethylenebis[(2,2,6,6-tetramethyl-4-piperidinyl)imino]]bis(4-allyloxy-6-ethylthio-1,3,5-triazine), 2,2'-[hexamethylenebis[(2,2,6,6-tetramethyl-4-piperidinyl)imino]]bis(4-allylamino-6-morpholino-1,3,5-triazine), 2,2'-[dodecamethylenebis[(2,2,6,6-tetramethyl-4-piperidinyl)imino]]bis(4-diallylamino-6-piperidino-1,3,5-triazine), 2,2'-[hexamethylenebis[(2,2,6,6-tetramethyl-4-piperidinyl)imino]]bis(4-diallylamino-6-pyrrolidyl-1,3,5-triazine), 2,2'-[1,4-cyclohexylenebis[(2,2,6,6-tetramethyl-4-piperidinyl)imino]]bis[4-diallylamino-6-(2-ethoxycarbonylethylamino)-1,3,5-triazine], 2,2'-(hexamethylenediimino)bis[4-allyloxy-6-(2,2,3,6,6-pentamethyl-4-piperidinyl)amino-1,3,5-triazine], 2,2'-[1,4-cyclohexylenebis(methylene)]bis[4-allylamino-6-(2-benzyl-2,6,6-trimethyl-4-piperidinyl)amino-1,3,5-triazine], 2,2'-(hexamethylenediimino)bis[4-allylamino-6-(7-azadispiro[5.1.5.3]hexadecan-15-yl)-amino-1,3,5-triazine], 2,2'-[1,4-cyclohexylenebis(ethylene)]bis[4-allylamino-6-(2,2,6,6-tetramethyl-4-piperidinyl)amino-1,3,5-triazine], 2,2'-[1,4-(phenylenedimethylene)bis[(2,2,6,6-tetramethyl-4-piperidinyl)imino]]bis(4,6-dimethallyloxy-1,3,5-triazine), 2,2'-[hexamethylenebis(methylimino)]bis[4-allylamino-6-(2,2,6,6-tetramethyl-4-piperidinyl)amino-1,3,5-triazine], 2,2'-[hexamethylenebis(n-hexylimino)]bis[4-diallylamino-6-(2,2,6,6-tetramethyl-4-piperidinyl)amino-1,3,5-triazine], 2,2'-(hexamethylenedioxy)bis[4-diallylamino-6-(2,2,6,6-tetramethyl-4-piperidinyl)amino-1,3,5-triazine], 2,2'-(ethylenedioxy)bis[4-allyloxy-6-(2,2,6,6-tetramethyl-4-piperidinyl)amino-1,3,5-triazine], 2,2'-(dodecamethylenedioxy)bis[4-diallylamino-6-(2,2,6,6-tetramethyl-4-piperidinyl)amino-1,3,5-triazine], 2,2'-(thiodiethylenedioxy)bis[4-diallylamino-6-(2,2,6,6-tetramethyl-4-piperidinyl)-oxy-1,3,5-triazine], 2,2'-[hexamethylenebis[(2-benzyl-2,6,6-trimethyl-4-piperidinyl)imino]]bis(4,6-diallyloxy-1,3,5-triazine), 2,2'-[methylenedi-4,1-cyclohexylenebis[(2,2,6,6-tetramethyl-4-piperidinyl)imino]]bis(4-allylamino-6-t-octylamino-1,3,5-triazine), 2,2'-[hexamethylenebis[(2,2,6,6-tetramethyl-4-piperidinyl)imino]]bis(4-allylamino-6-t-octylamino-1,3,5-triazine), 2,2'-[hexamethylenebis[(2,2,6,6-tetramethyl-4-piperidinyl)imino]]bis(4,6-di-allylamino-1,3,5-triazine), 2,2'-[ethylenebis[(2,2,6,6-tetramethyl-4-piperidinyl)imino]]bis(4-allyloxy-6-t-octylamino-1,3,5-triazine), 2,2'-[ethylenebis[(2,2,6,6-tetramethyl-4-piperidinyl)imino]]bis(4,6-di-allylamino-1,3,5-triazine), 2,2'-(hexamethylenediimino)bis[4-allylamino-6-[[6-[(2,2,6,6-tetramethyl-4-piperidinyl)amino]hexyl]amino]-1,3,5-triazine], and 2,2'-(hexamethylenediimino)bis[4-allyloxy-6-[[6-[(2,2,6,6-tetramethyl-4-piperidinyl)oxy]hexyl]amino]-1,3,5-triazine, and the like.

The compounds of this invention are useful as light stabilizers for thermoplastic substrates such as polyolefins, polyesters, polyethers, polyurethanes, polystyrenes, high-impact polystyrenes, and the like. Preferably, the thermoplastic substrate is a polyolefin.

Other organic materials susceptible to degradation by the effects of light, the properties of which are improved by the incorporation therein of a compound of this invention, include natural and synthetic rubbers; the latter include, for example, homo-, co- and terpolymers of acrylonitrile, butadiene and styrene, and blends thereof.

The compounds of formula (I) are particularly useful in polyolefins, such as polyethylene, polypropylene, polybutylene, and the like, and copolymers thereof.

Generally, the compositions comprise a polymer containing from about 0.1% to about 5% by weight of the compound of formula (I) based on the weight of the polymer.

Preferably, the composition comprises a polyolefin containing from about 0.2% to about 2% by weight of the compound of formula (I), based on the weight of the polyolefin.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'bis(2,6-di-t-butylphenol); 4,4'-bis(2,6-diisopropylphenol); 2,4,6-tri-t-butylphenol; 2,2'-thiobis(4-methyl-6-t-butylphenol); octadecyl 2(3',5'-di-t-butyl-4'-hydroxyphenyl)-propionate, 1,3,5-tris(4-t-butyl-3-hydroxy-2,6-dimethylbenzyl)-s-triazine-2,4,6-(1H,3H,5H)-trione; esters of thiodipropionic acid, such as dilauryl thiodipropionate and distearyl thiodipropionate, etc; hydrocarbyl phosphites, such as triphenyl phosphite, trinonyl phosphite, diisodecyl pentaerythrityl diphosphite, diphenyldecyl phosphite, etc; and combinations thereof.

Suitable supplemental light stabilizers include those of the benzotriazole class, such as 2-(2'-hydroxy-5'-t-octylphenyl)benzotriazole; 2-(2'-hydroxy-3',5'-di-t-butylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4,4'-dimethoxybenzophenone; hindered phenol esters, such as n-hexadecyl 3,5-di-t-butyl-4-hydroxybenzoate, and 2',4'-di-t-butylphenyl 3,5-di-t-butyl-4-hydroxybenzoate; metal complexes, such as nickel complexes of 2,2'-thiobis(4-t-octylphenol); nickel butylamine complex of 2,2'thiobis(4-t-octylphenol); nickel complexes of bis(4-t-octylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc; nickel complex of 2-hydroxy-4-methylphenyl undecyl ketone oxime, etc. Further illustrative examples of suitable antioxidants and supplemental light stabilizers can be found in columns 3 and 4 of U.S. Pat. Nos. 3,488,290 and 3,496,134 and in the other patents mentioned therein.

As with the compound of formula (I), the additive is advantageously employed within the range from about 0.2% to about 2% by weight, based on the weight of the untreated polymer.

The compound of formula (I) may be incorporated into the polymeric substrate by any of the known techniques for compounding additives with a polymer. For example, the compound of formula (I) and the additive may be compounded by dry blending with the substrate in powder or granular form, followed by milling, Banbury mixing, molding, casting, extruding, swelling, and the like. Alternatively, the compound of formula (I) may be added, as a solution or slurry in a suitable inert solvent, or dispersant, to the polymeric substrate in powder or granular form, the whole mixed intimately in a mixer, and the solvent subsequently removed. As a further possibility, the compound of formula (I) may be added to the polymeric substrate during the preparation of the latter, for instance at the latex stage of polymer production, to provide prestabilized polymer material.

The following examples illustrate the present invention. All parts and percentages are by weight unless otherwise indicated.

EXAMPLE 1

Preparation of 2,2'-[Hexamethylenebis[(2,2,6,6-tetramethyl-4-piperidinyl)imino]]bis(4,6-diallylamino-1,3,5-triazine)

A mixture of 2,4-bis(diallylamino)-6-chloro-1,3,5-triazine (14.2 grams; 0.046 mole), 4,4'-(hexamethylenediimino)bis(2,2,6,6-tetramethylpiperidine) (9.2 grams; 0.023 mole), powdered sodium hydroxide (1.84 grams; 0.046 mole), and xylene (50 mls) is heated at reflux for 36 hours using a water separator to remove byproduct water. The reaction mixture is then filtered hot and the filtrate is evaporated to obtain a light yellow oil which solidifies on standing. Recrystallization of the solid from hexane gives white needles which on recovery and drying weigh 9.3 grams, mp 119°–120° C.

Calculated for $C_{54}H_{88}N_{14}$: C,69.53%; H,9.44%; N,21.03%. Found: C,69.45%; H,9.44%; N,20.86%.

EXAMPLE 2

Preparation of 2,2'-[Hexamethylenebis[(2,2,6,6-tetramethyl-4-piperidinyl)imino]]bis(4-diallylamino-6-methoxy-1,3,5-triazine)

A mixture of 2-diallylamino-4-chloro-6-methoxy-1,3,5-triazine (21.6 grams; 0.09 mole), 4,4'-(hexamethylenediimino)bis(2,2,6,6-tetramethylpiperidine) (17.9 grams; 0.045 mole), powdered sodium hydroxide (3.6 grams; 0.09 mole), and xylene (150 mls) is heated at reflux for 24 hours using a water separator to remove water therefrom. The reaction mixture is then processed as described in Example 1 to obtain 21.3 grams of crystalline product, mp 113°–115° C.

Calculated for $C_{44}H_{74}N_{12}O_2$: C,65.82%; H,9.23%; N,20.95%. Found: C,65.61%; H,8.95%; N,21.12%.

EXAMPLE 3

Preparation of 2,2'-[Hexamethylenebis[(2,2,6,6-tetramethyl-4-piperidinyl)imino]]bis(4-diallylamino-6-t-octylamino-1,3,5-triazine)

A stirred solution of 4,4'(hexamethylenediimino)-bis(2,2,6,6-tetramethylpiperidine) (9.5 grams; 0.024 mole), 2-diallylamino-4-chloro-6-t-octylamino-1,3,5-triazine (16.0 grams; 0.048 mole), and powdered sodium hydroxide (2.0 grams; 0.05 mole) in xylene (150 mls) is heated at reflux for 24 hours while removing by-product water by means of a trap. The resulting mixture is then filtered and the filtrate is heated to evaporate the solvent and obtain a light tan oil which solidifies on triturating with petroleum ether. The solid is then recovered and dried to obtain 4.6 grams of the desired product, mp 113115° C.

Calculated for $C_{58}H_{104}N_{14}$: C,69.87%; H,10.44%; N,19.68%. Found: C,69.70%; H,11.02%; N,19.78%.

EXAMPLE 4

Preparation of 2,2'-[Hexamethylenebis[(2,2,6,6-tetramethyl-4-piperidinyl)imino]]bis(4-allyloxy-6-t-octylamino-1,3,5-triazine)

A stirred mixture of 4,4'(hexamethylenediimino)-bis(2,2,6,6-tetramethylpiperidine) (10.0 grams; 0.025 mole), 2-allyloxy-4-chloro-6-t-octylamino-1,3,5-triazine (15.1 grams; 0.05 mole), and powdered sodium hydroxide (2.0 grams; 0.05 mole) in xylene (150 mls) is heated at reflux for 24 hours while removing by-product water by means of a trap. The reaction mixture is filtered while hot to remove insolubles. Upon cooling the filtrate, a white crystalline solid precipitates. The solid is recovered by filtration and dried to obtain 15.7 grams of the desired product, mp 210°–212° C.

Calculated for $C_{52}H_{92}N_{12}O_2$: C,68.12%; H,10.04%; N,18.34%. Found: C,68.56%; H,10.83%; N,17.75%.

EXAMPLE 5

Preparation of
2,2'-[Hexamethylenebis[(2,2,6,6-tetramethyl-4-piperidinyl)imino]]bis(4-allylamino-6-t-octylamino-1,3,5-triazine)

A stirred mixture of 4,4'(hexamethylenediimino)-bis(2,2,6,6-tetramethylpiperidine) (8.0 grams; 0.0202 mole) in xylene (75 mls) is heated at reflux for 2 hours while removing water therein by means of a water trap. Powdered sodium hydroxide (1.62 grams; 0.0404 mole) and 2,4-diallylamino-6-chloro-1,3,5-triazine (9.1 grams; 0.0404 mole) are added to the xylene and stirring and heating at reflux is continued for 18 hours. The reaction mixture is then cooled to 25° C., and acetonitrile (200 mls) and water (50 mls) are added. The mixture is then stirred and heated at reflux for one hour, cooled to 25° C., and allowed to settle. The aqueous phase is then separated and the organic phase is washed with water. The aqueous phase is separated again and the organic phase is dried over anhydrous sodium sulfate. The mixture is filtered and the filtrate is concentrated to about 50 mls. On standing crystals are deposited which after recovery, rinsing with diethyl ether and drying weigh 8.2 grams, mp 160°–162° C. Recrystallization from xylene gives a melting point of 161°–162° C.

Calculated for $C_{42}H_{72}N_{14}$: C,65.24%; H,9.39%; N,25.37%. Found: C,65.83%; H,9.40%; N,24.76%.

EXAMPLE 6

Preparation of
2,2'-[Hexamethylenebis[(2,2,6,6-tetramethyl-4-piperidinyl)imino]]bis(4,6-di-allylamino-1,3,5-triazine)

A stirred mixture of 2,2'(hexamethylenediimino)-bis(2,2,6,6-tetramethylpiperidine) (6.36 grams; 0.0161 mole), 2-chloro-4,6-bis(t-octylamino)-1,3,5-triazine (9.56 grams; 0.0322 mole), and powdered sodium hydroxide (1.29 grams; 0.0322 mole) in xylene (75 mls) is stirred and heated at reflux while removing water therein by means of a water trap. The reaction mixture is stirred and heated at reflux for 18 hours, cooled to 25° C., and treated with acetonitrile (200 mls). The reaction mixture is filtered to recover a precipitate, and the solid is washed successively with water and acetone, and dried to obtain 10.0 grams of product which melts at 208°–209° C. after recrystallization from xylene.

Calculated for $C_{52}H_{94}N_{14}$: C,68.22%; H,10.35%; N,21.43%. Found: C,69.11%; H,10.48%; N,19.81%.

EXAMPLES 7–10

Testing in Polypropylene

The compounds of Examples 1–4 (0.25 gram) are separately dry blended with a mastermix of 100 grams of unstabilized polypropylene (Pro-fax ®6401) and 0.1 gram of a processing antioxidant, 2,4,6-tri-t-butylphenol. The blend is milled at 350°–370° F. for five minutes, and then compression molded at 400° F. into a film 4–5 mils thick. The film and a control film, identically prepared without the compound under test, are exposed to a xenon arc in an Atlas Weather-Ometer ® until they fail. A film is considered as having failed when the carbonyl content of the infrared absorption spectrum increases by 0.10 weight percent, a generally accepted point of film embrittlement.

The data in Table I show the number of hours required to increase the carbonyl content by 0.1% by weight for the compounds under test and a control film.

TABLE I

| Example | Additive | Hours to Failure |
| --- | --- | --- |
| 7 | Product of Example 1 | 1600 |
| 8 | Product of Example 2 | >1200 |
| 9 | Product of Example 3 | >900 |
| 10 | Product of Example 4 | >700 |
|  | None | <200 |

What is claimed is:

1. A method of stabilizing a polymer which is normally subject to degradation by ultraviolet radiation which comprises incorporating into said polymer an ultraviolet radiation stabilizingly effective amount of a compound of the formula (I)

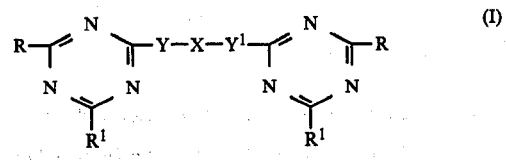

wherein R represents $C_3$–$C_6$ alkenyloxy, $C_3$–$C_6$ alkenylamino, or di($C_3$–$C_6$ alkenyl)amino; $R^1$ represents $C_1$–$C_8$ alkyl, $C_1$–$C_8$ alkoxy, halo, $C_1$–$C_8$ alkylthio, $C_3$–$C_6$ alkenyloxy, amino, $C_3$–$C_6$ alkenylamino, di($C_3$–$C_6$ alkenyl)amino,

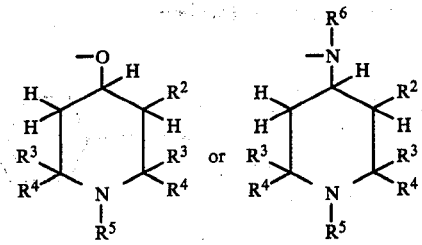

wherein $R^2$, $R^3$, $R^4$, $R^5$, and $R^6$ are as defined below, $C_1$–$C_{18}$ alkylamino, $C_1$–$C_{18}$ dialkylamino, morpholino, piperidino, pyrrolidyl, a substituted $C_1$–$C_{18}$ alkylamino, or a substituted $C_1$–$C_{18}$ dialkylamino, wherein the substituents are selected from amino, cyano, carboxy, alkoxycarbonyl wherein the alkoxy moiety has 1 to 8 carbon atoms, and the groups

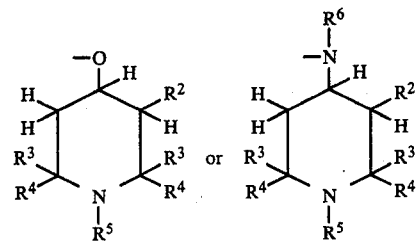

wherein $R^2$ represents hydrogen, $C_1$-$C_8$ alkyl, or benzyl; $R^3$ and $R^4$ independently represent $C_1$-$C_8$ alkyl, benzyl, or phenethyl, or together with the carbon to which they are attached form a $C_5$-$C_{10}$ cycloalkyl; and $R^5$ represents hydrogen, $C_2$-$C_3$ hydroxyalkyl, $C_1$-$C_8$ alkyl, hydroxyl, or oxyl; $R^6$ rerepsents hydrogen, $C_1$-$C_8$ alkyl, or

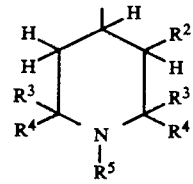

wherein $R^2$, $R^3$, $R^4$, and $R^5$ are as previously defined; Y and $Y^1$, which may be the same, or different, represent oxy, or

wherein $R^6$ is as previously defined; X represents $C_2$-$C_{12}$ alkylene, wherein the alkylene chain may be interrupted by an oxy, thio, or

radical, $C_5$-$C_{10}$ cycloalkylene,

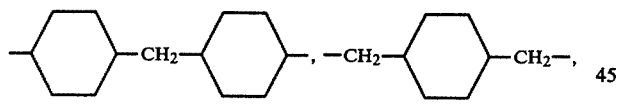

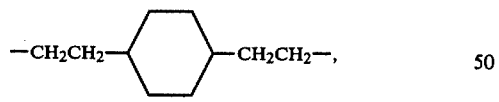

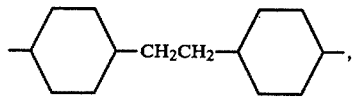

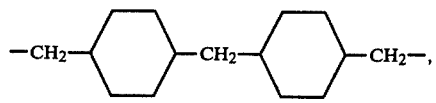

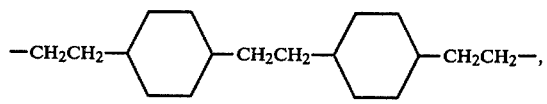

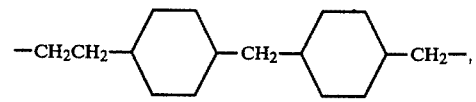

$C_6$-$C_{12}$ arylene, or $C_8$-$C_{14}$ aralkylene; with the proviso that when Y and Y' are oxy, or $R^6$ is hydrogen, or $C_1$-$C_8$ alkyl, at least one $R^1$ is, or contains

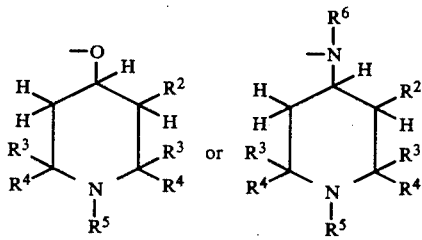

and with the further proviso that R and $R^1$ are not allyloxy at the same time.

2. The method of claim 1 wherein the stabilizer is incorporated in a concentration of from about 0.2 to 2% based on the weight of the polymer.

3. The method of claim 1 wherein the polymer is a polyolefin.

4. The method of claim 1, wherein the polyolefin is polypropylene.

5. The method of claim 1 wherein X is $-(CH_2)_6-$ and Y and $Y^1$ are each

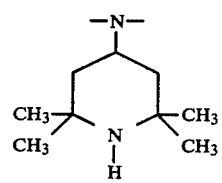

6. The method of claim 1 wherein Y is selected from diallylamino, allyloxy and allylamino, $R^1$ is selected from diallylamino, methoxy, t-octylamino, and allylamino.

7. The composition produced by the method of claim 1.

* * * * *